US007178966B2

(12) United States Patent
Yu et al.

(10) Patent No.: US 7,178,966 B2
(45) Date of Patent: Feb. 20, 2007

(54) LIGHT GUIDE PLATE WITH NONUNIFORMLY ORIENTED DIFFUSING ELEMENTS

(75) Inventors: Tai-Cherng Yu, Tu-Cheng (TW); Charles Leu, Fremont, CA (US); Ga-Lane Chen, Fremont, CA (US)

(73) Assignee: Hon Hai Precision Industry Co., Ltd. (TW)

( * ) Notice: Subject to any disclaimer, the term of this patent is extended or adjusted under 35 U.S.C. 154(b) by 95 days.

(21) Appl. No.: 10/977,820

(22) Filed: Oct. 29, 2004

(65) Prior Publication Data
US 2005/0174807 A1 Aug. 11, 2005

(30) Foreign Application Priority Data
Dec. 5, 2003 (TW) .............................. 92134339 A

(51) Int. Cl.
*F21V 7/04* (2006.01)

(52) U.S. Cl. .................................................... 362/626

(58) Field of Classification Search ................ 362/626
See application file for complete search history.

(56) References Cited

U.S. PATENT DOCUMENTS
5,600,462 A * 2/1997 Suzuki et al. ............... 349/112
2004/0145915 A1* 7/2004 Kim et al. ................... 362/559

FOREIGN PATENT DOCUMENTS
JP 11052378 A * 2/1999

* cited by examiner

*Primary Examiner*—Ali Alavi
*Assistant Examiner*—William J Carter
(74) *Attorney, Agent, or Firm*—Morris Manning & Martin; Tim Tingkang Xia, Esq.

(57) ABSTRACT

A light guide plate (2) into which light beams are introduced from a light source has a light incident surface (21) receiving the light beams, a light emitting surface (22) transmitting the light beams therethrough, and a bottom surface (23) opposite to the light emitting surface. The light incident surface is between the bottom surface and the light emitting surface. The bottom surface has at least two sets of diffusing elements (231, 232) for diffusing and reflecting light beams toward the light emitting surface. Each set forms a continuous region at the bottom surface, and the at least two sets totally cover the bottom surface. The at least two sets of include diffusing elements that are formed along two different directions. By utilization of the at least two sets of diffusing elements, the light guide plate provides a uniform luminance over the whole of the light emitting surface.

10 Claims, 5 Drawing Sheets

6

7

LIGHT GUIDE PLATE WITH NONUNIFORMLY ORIENTED DIFFUSING ELEMENTS

BACKGROUND OF THE INVENTION

1. Field of the Invention

The present invention relates to a light guide plate using back-lighting or front-lighting to illuminate a liquid crystal display (LCD), and particularly to a light guide plate having a bottom surface configured to ensure uniform illumination.

2. The Prior Art

In general, LCDs have two main advantages in comparison with cathode ray tubes (CRTs): LCDs are thin, and have low power consumption. It has been said that LCDs might one day completely replace CRT display devices, and LCDs have aroused great interest in many industries in recent times. In general, an LCD needs a surface light source to provide even light for a clear display.

A surface light source generally comprises a light source and a light guide plate. The light source may be a linear light source, or one or more point light sources. The light guide plate has an end face through which light is introduced, and two opposite major faces one of which functions as an emission face. The performance of the surface light source mainly depends on the characteristics of the light guide plate employed therein.

A light guide plate functions to change a propagation direction of light beams introduced into the light guide plate through a side end face thereof. The propagation direction is changed from a direction roughly parallel to an emission face of the light guide plate to a direction perpendicular to the emission face. A simple, planar transparent light guide plate has poor capability for deflecting light, and provides unsatisfactory brightness at the emission face. Various modifications of the light guide plate have been devised for promoting bright and uniform emission at the emission face.

For example, referring to FIG. 9, a conventional light guide plate 10 includes a light incident surface 101, a light emitting surface 102 adjoining the light incident surface 101, and a bottom surface 103 opposite to the light emitting surface 102. The bottom surface 103 defines a plurality of parallel V-shaped grooves 11, with the V-shaped grooves 11 being oriented parallel to the light incident surface.

As shown in FIG. 10, in use of the light guide plate 10, light beams from a light source (not shown) are introduced into the light guide plate 10 through the light incident surface 101. A portion of the light beams directly propagates out from the light emitting surface 102. Another portion of the light beams propagates to the bottom surface 103, and is reflected by the V-shaped grooves 11 toward the emitting surface 102. The V-shaped grooves 11 can reflect light beams in different directions, and thereby eliminate total internal reflection. The vertex angle of the V-shaped grooves 11 can be configured to control the overall emission of light beams from the light emitting surface 102. However, the V-shaped grooves 11 have a single uniform orientation, such that light beams reflected have only a limited range of directions. Thus, the light guide plate 10 generally does not provide uniform emission over the whole of the light emitting surface 102.

A new light guide plate that overcomes the above-mentioned disadvantages is desired.

SUMMARY OF THE INVENTION

An object of the present invention is to provide a light guide plate for a surface light source device used with an LCD panel, in which the light guide plate provides highly uniform luminance.

To achieve the above-mentioned object, a light guide plate into which light beams are introduced from a light source has a light incident surface for receiving the light beams from the light source, a light emitting surface transmitting the light beams therethrough, and a bottom surface opposite to the light emitting surface. The light incident surface is between the bottom surface and the light emitting surface. The bottom surface has at least two sets of diffusing elements for diffusing and reflecting light beams toward the light emitting surface. Each set of diffusing elements forms a continuous region at the bottom surface, and the at least two sets of diffusing elements totally cover the bottom surface. The at least two sets of diffusing elements include diffusing elements that are formed along two different directions. One direction of the diffusing elements is parallel to the light incident surface, and the other direction of the diffusing elements is perpendicular to the light incident Surface.

The light guide plate may be employed in a surface light source device for back-lighting or front-lighting of an LCD panel. When so used, the performance of the surface light source device is increased since the light guide plate illuminates the surface light source device uniformly.

Other objects, advantages and novel features of the invention will become more apparent from the following detailed description when taken in conjunction with the accompanying drawings, in which:

DETAILED DESCRIPTION OF THE PREFERRED EMBODIMENT

Figure 1:
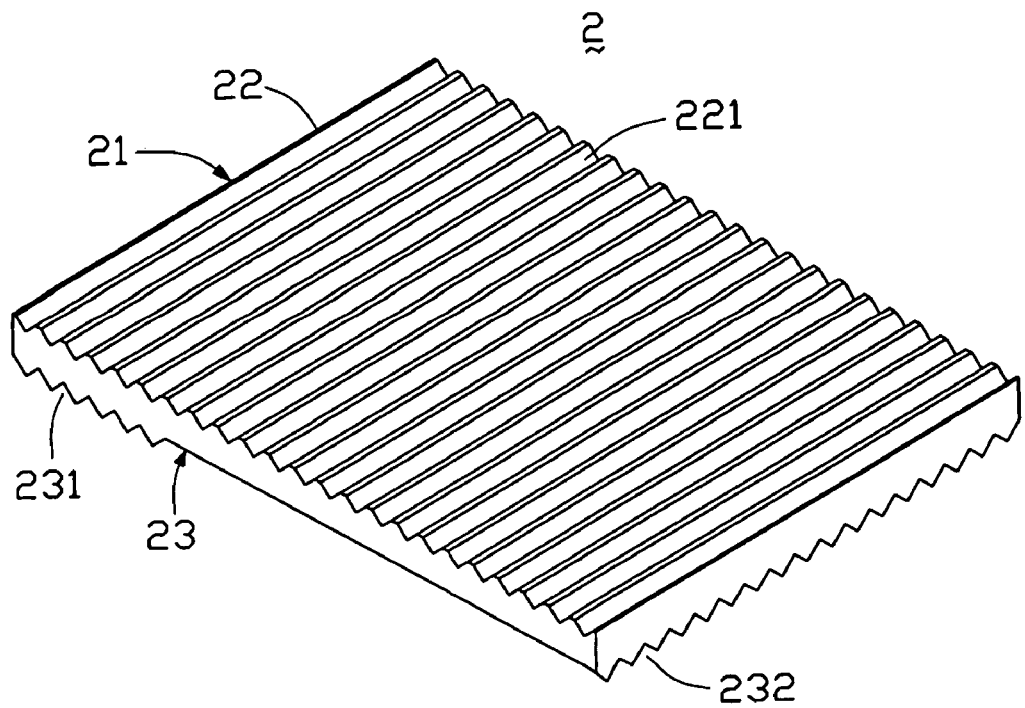
FIG. 1 is an isometric view of a light guide plate in accordance with a preferred embodiment of the present invention.

Referring to FIG. 1, a light guide plate-like member 2 of the present invention is made of transparent synthetic resin, such as an acrylic resin, a polycarbonate, or the like. The light guide plate 2 is essentially a sheet having uniform thickness, and comprises a light incident surface 21 for introducing light beams into the light guide plate 2 from a light source (not shown), a bottom surface 23 for diffusing and reflecting light beams transmitting inside the light guide plate 2, and a light emitting surface 22 opposite to the bottom surface 23. The incident surface 21 is between the bottom surface 23 and the emitting surface 22. The emitting surface 22 has a plurality of parallel V-shaped prisms 221 formed thereat. The prisms 221 are parallel to the incident surface 21, and are for concentrating light beams toward predetermined directions.

Figure 2:
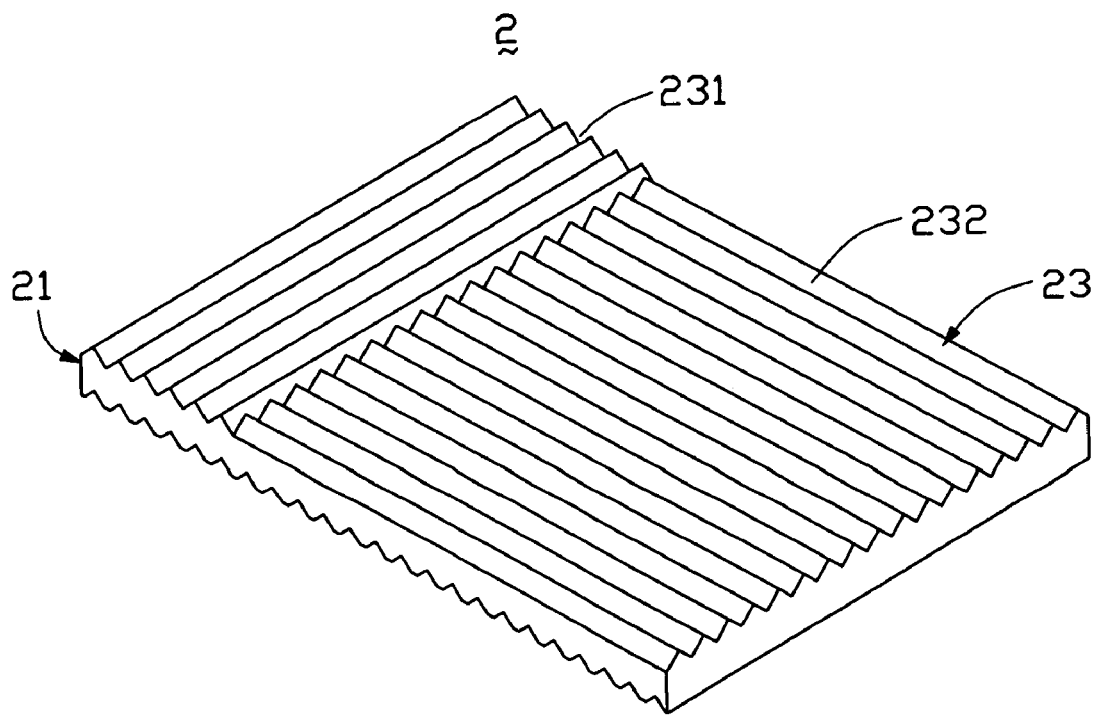
FIG. 2 is an inverted view of the light guide plate of FIG. 1.
Figure 3:
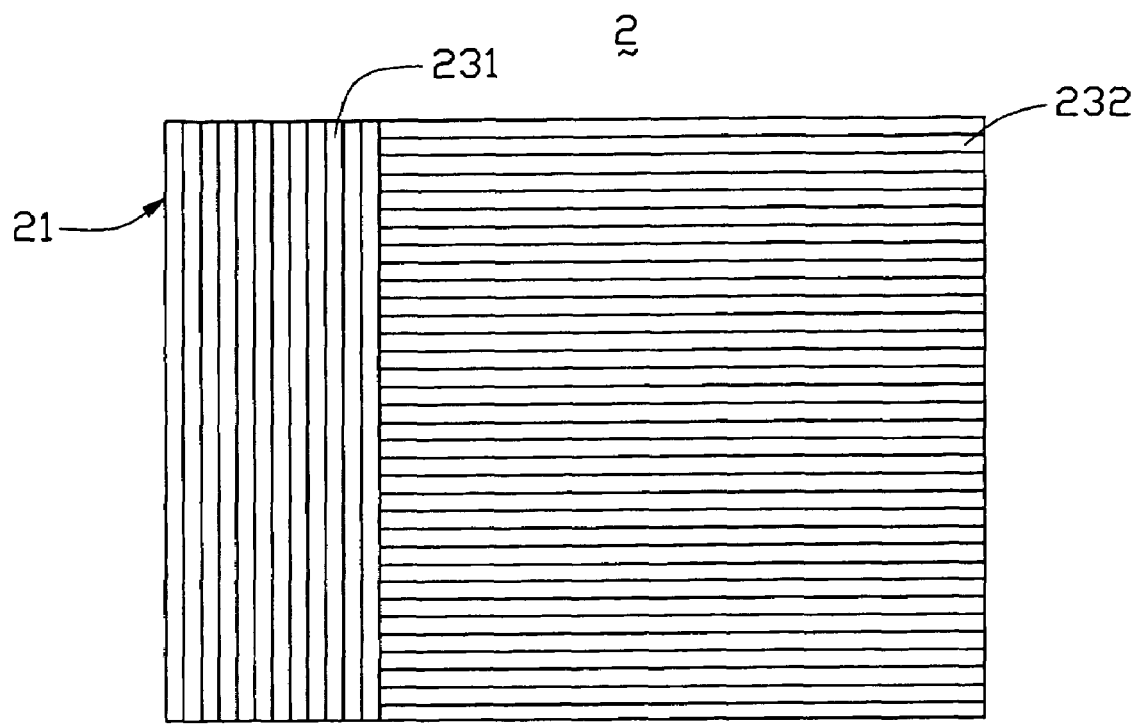
FIG. 3 is a bottom plan view of the light guide plate of FIG. 1.

Referring to FIGS. 2 and 3, these are isometric and plan views respectively of a bottom of the light guide plate 2. The bottom surface 23 has two sets of V-shaped grooves 231, 232. The set of V-shaped grooves 231 is adjacent to the incident surface 21, with the V-shaped grooves 231 being parallel to the incident surface 21. The set of V-shaped grooves 232 is distal from the incident surface 21, with the V-shaped grooves 232 being perpendicular to the incident surface 21. Each set of V-shaved grooves 231, 232 forms a continuous region at the bottom surface 23, and all the V-shaped grooves 231, 232 together totally cover the bottom surface 23. The V-shaped grooves 232, 232 all lie in a substantially same horizontal plane, and the regions formed by the different sets of V-shaped grooves 231, 232 adjoin each other but do not overlap. The V-shaped grooves 231, 232 are used as diffusing elements for diffusing and reflecting light beams toward the emitting surface 22.

In operation, when light beams from a light source are introduced into the light guide plate 2 through the incident surface 21, light beams impinging on the bottom surface 23 are reflected and diffused by the two sets of V-shaped grooves 231, 232. The V-shaped grooves 231, 232 disperse the light beams over wide ranges and thereby eliminate inner total internal reflection. The light beams propagate to the emitting surface 22, where they are concentrated by the prisms 221 so that they emit from the emitting surface 22 toward the predetermined directions.

The light guide plate 2 of the preferred embodiment of the present invention has the following advantages. Because the two sets of V-shaped grooves 231, 232 are oriented in two substantially different directions on the bottom surface 23 of the light guide plate 2, the light beams impinging thereon are direction reflected and diffused in a wide variety of directions. Therefore, the light guide plate 2 can attain highly uniform luminance over the whole emitting surface 22. Accordingly, a surface light source incorporating the light guide plate 2 provides highly uniform luminance.

Referring to FIGS. 4–8, these are bottom views of light guide plates in accordance with various alternative embodiments of the present invention. Each embodiment has a particular distribution of grooves at the bottom surface of the light guide plate. In each embodiment, each set of V-shaped grooves forms a continuous region at the bottom surface, and all the V-shaped grooves together totally cover the bottom surface. The V-shaped grooves all lie in substantially a same horizontal plane. The regions formed by the different sets of V-shaped grooves adjoin each other but do not overlap, except in the case of the embodiment of FIG. 8.

Figure 4:
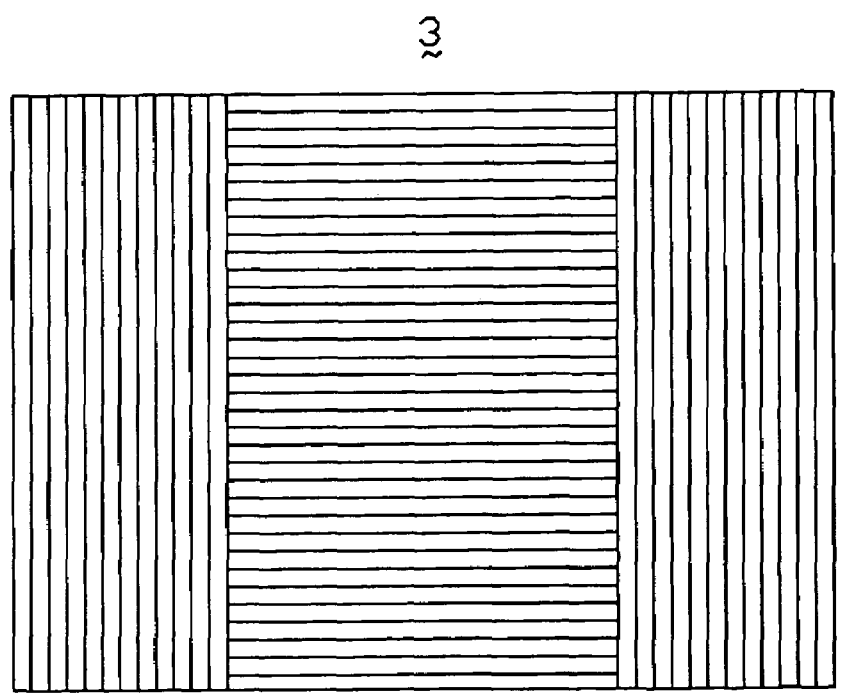
FIG. 4 is a bottom plan view of a light guide plate according to a second embodiment of the present invention.
Figure 5:
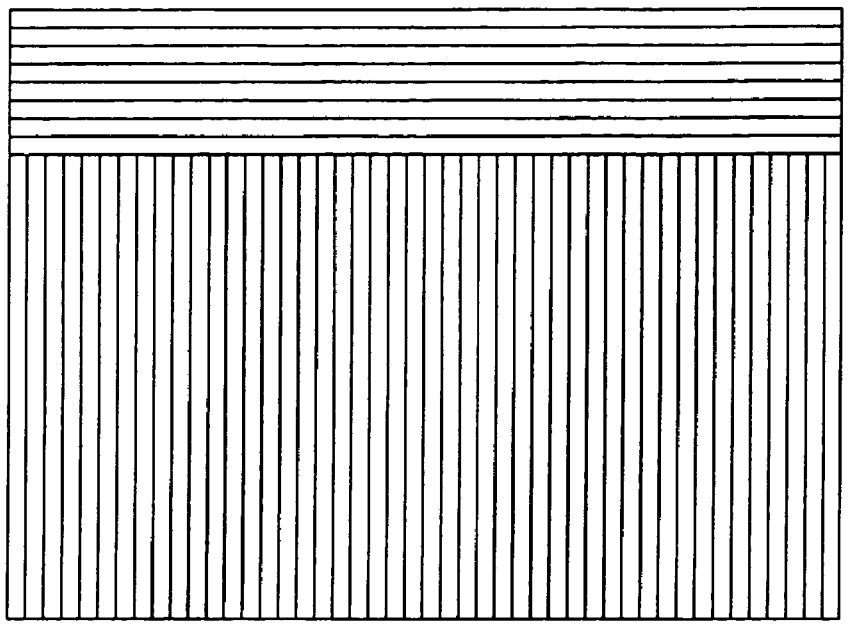
FIG. 5 is a bottom plan view of a light guide plate according to a third embodiment of the present invention.

In FIG. 4, a light guide plate 3 of the second embodiment has three sets of V-shaped grooves, One central set of parallel V-shaped grooves has the V-shaped grooves oriented perpendicular to the light incident surface. The other two sets of parallel V-shaped grooves are located at opposite sides of the central set of V-shaped grooves respectively, with the V-shaped grooves of each such set being oriented parallel to the incident surface, In FIG. 5, a light guide plate 4 of the third embodiment has two adjacent sets of V-shaped grooves, each set spanning from the light incident surface to an opposite surface of the light guide plate. One of the sets of V-shaped grooves has the parallel V-shaped grooves oriented perpendicular to the light incident surface. The other set of V-shaped grooves has the parallel V-shaped grooves oriented parallel to the incident surface.

Figure 6:
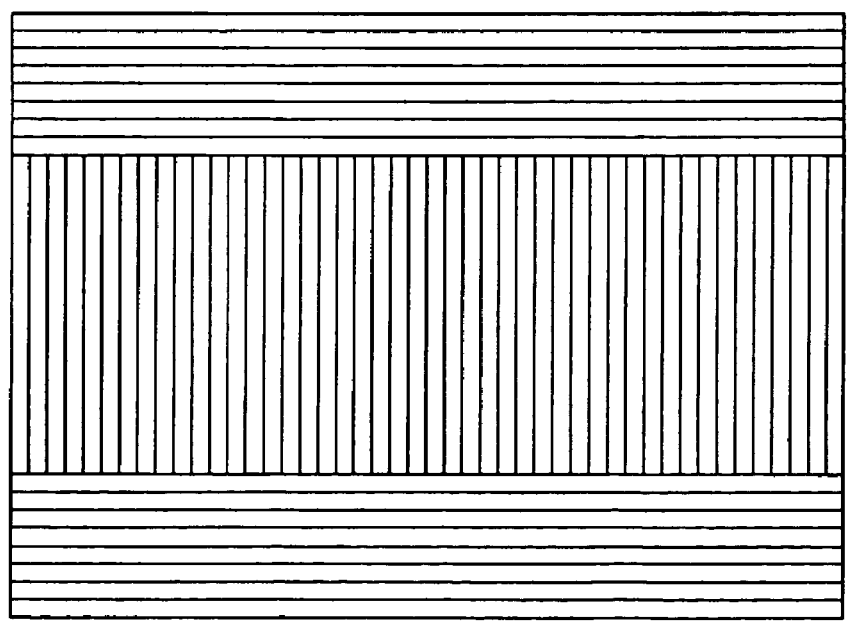
FIG. 6 is a bottom plan view of a light guide plate according to a fourth embodiment of the present invention.

In FIG. 6, a light guide plate 5 of the fourth embodiment has three sets of V-shaped grooves, each set spanning from the light incident surface to an opposite surface of the light guide plate. One central set of V-shaped grooves has the parallel V-shaped grooves oriented parallel to the light incident surface. The other two sets of V-shaped grooves are located at opposite sides of the central set of V-shaped grooves respectively, with the parallel V-shaped grooves of each such set being oriented perpendicular to the incident surface.

Figure 7:
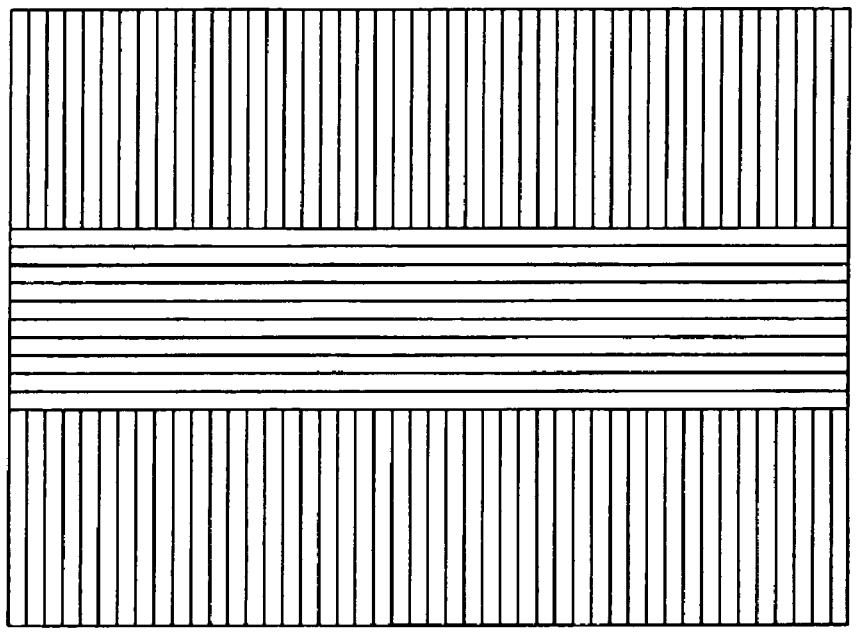
FIG. 7 is a bottom plan view of a light guide plate according to a fifth embodiment of the present invention.

In FIG. 7, a light guide plate 6 of the fifth embodiment has three sets of V-shaped grooves, each set spanning from the light incident surface to an opposite surface of the light guide plate. One central set of V-shaped grooves has the parallel V-shaped grooves oriented perpendicular to the light incident surface. The other two sets of V-shaped grooves are located at opposite sides of the central set of V-shaped grooves respectively, with the parallel V-shaped grooves of each such set being oriented parallel to the incident surface.

Figure 8:
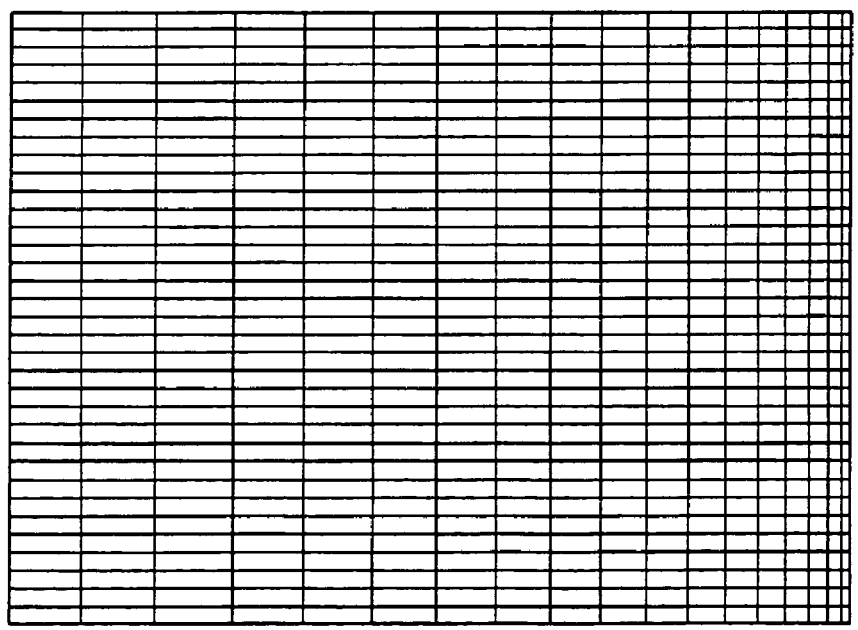
FIG. 8 is a bottom plan view of a light guide plate according to a sixth embodiment of the present invention.
Figure 9:
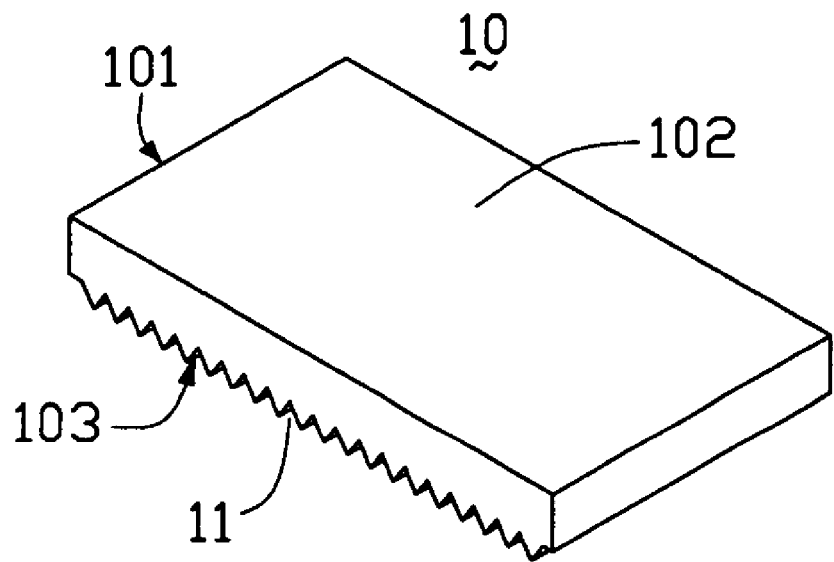
FIG. 9 is an isometric view of a conventional light guide plate.
Figure 10:
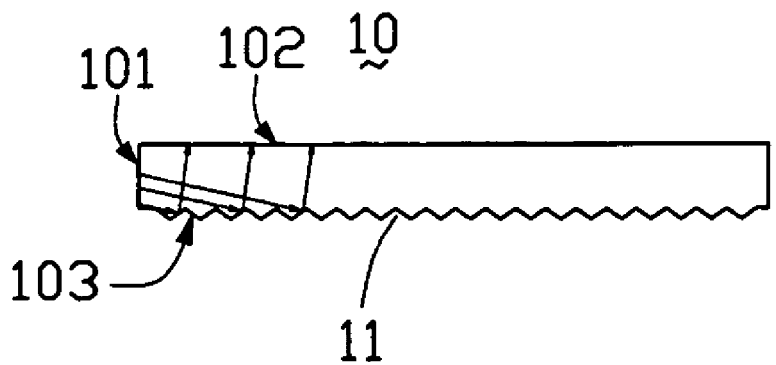
FIG. 10 is a side plan view of the light guide plate of FIG. 9, showing essential optical paths thereof.

In FIG. 8, a light guide plate 7 of the sixth embodiment has two sets of V-shaped grooves. One set of V-shaped grooves has the parallel V-shaped grooves oriented parallel to the light incident surface. The other set of V-shaped grooves has the parallel V-shaped grooves oriented perpendicular to the incident surface. The V-shaped grooves of the two sets of grooves perpendicularly cross each other.

In alternative embodiments of the light guide plate 2 of the present invention, the light guide plate 2 can be essentially wedge-shaped. A pitch (not labeled) between adjacent prisms 221 of the emitting surface 22 can be configured according to the needed luminance of the emitting surface 22. In particular, the pitch between adjacent prisms 221 can progressively decrease with increasing distance away from the incident surface 21. Further, a pitch between adjacent V-shaped grooves 231 and/or 232 of the bottom surface 23 can be configured according to the spread of the light beams received from the light source. For example, the pitch between adjacent V-shaped grooves 231 can progressively decrease with increasing distance away from the incident surface 21. Moreover, the pitches between adjacent prisms 221 and/or between adjacent V-shaped grooves 231 and/or 232 of the bottom surface 23 can be configured according to the particular optical characteristics of various parts of the overall system and according to need, to ensure uniformity of exiting light beams over the whole of the emitting surface 22.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

We claim:

1. A light guide plate into which light beams can be introduced from a light source, comprising:

a light incident surface receiving the light beams from the light source;

a light emitting surface for emitting the light beams therefrom; and a bottom surface opposite to the light emitting surface;

wherein the light incident surface is between the bottom surface and the light emitting surface, the bottom surface has at least two sets of diffusing elements for diffusing and reflecting light beams toward the light emitting surface, each set of diffusing elements forms a continuous region at the bottom surface, the at least two sets of diffusing elements together totally cover the bottom surface, the at least two sets of diffusing elements comprise V-shaped grooves that are oriented in at least two different directions respectively, the V-shaped grooves of all the sets of diffusing elements lie in a same horizontal plane, and the regions formed by the different sets of diffusing elements are adjacent to each other but do not overlap;

wherein the at least two sets of diffusing elements comprise three sets of adjacent V-shaped grooves, each of which spans across said bottom surface along a selective direction from a first direction defined from said incident surface to an opposite surface of said light guide member to said incident surface, and a second direction defined between two side surfaces of said light guide member neighboring said incident surface respectively.

2. The light guide plate as claimed in claim 1, wherein the V-shaped grooves of one of the sets of diffusing elements are parallel to the light incident surface, and the V-shaped grooves of another of the sets of diffusing elements are perpendicular to the light incident surface.

3. The light guide plate as claimed in claim 2, wherein one set of V-shaped grooves is adjacent to the incident surface, with the V-shaped grooves thereof oriented parallel to the incident surface, and another set of V-shaped grooves is distal from the incident surface, with the V-shaped grooves thereof oriented perpendicular to the incident surface.

4. The light guide plate as claimed in claim 2, wherein one central set of V-shaped grooves has the V-shaped grooves thereof oriented perpendicular to the incident surface, and two other sets of V-shaped grooves are located at opposite sides of the central set respectively, with the V-shaped grooves of said two other sets being oriented parallel to the incident surface.

5. The light guide plate as claimed in claim 2, wherein the three sets of adjacent V-shaped grooves each span from the incident surface to an opposite surface of the light guide plate, a central one of the thee sets has the V-shaped grooves thereof oriented parallel to the incident surface, and the other two of the three sets are located at opposite sides of the central set respectively, with the V-shaped grooves of the other two sets being oriented perpendicular to the incident surface.

6. The light guide plate as claimed in claim 2, wherein the three sets of adjacent V-shaped grooves each span from the incident surface to an opposite surface of the light guide plate, a central one of the three sets has the V-shaped grooves thereof oriented perpendicular to the incident surface, and the other two of the three sets are located at opposite sides of the central set respectively, with the V-shaped grooves of the other two sets being oriented parallel to the incident surface.

7. A light guide member for receiving light from a light source and emitting said light therefrom, comprising:

a light incident surface facing said light source to receive said light from said light source;

a light emitting surface for emitting said light therefrom; and a bottom surface interferingly located in a path of said light from said light incident surface and said light emitting surface in said light guide member, and having at least two sets of diffusing elements extending along at least two different directions respectively for diffusing said light along said at least two different directions, each set of diffusing elements forming a continuous region at the bottom surface, said at least two sets of diffusing elements together totally covering the bottom surface, said diffusing elements comprising V-shaped grooves formed on said bottom surface, said V-shaped grooves of all the sets of diffusing elements lying in a same horizontal plane, and said regions formed by said different sets of diffusing elements being adjacent to each other but not overlapping;

wherein said at least two sets of diffusing elements comprise three sets of adjacent V-shaped grooves, each of which spans across said bottom surface along a selective direction from a first direction defined from said incident surface to an opposite surface of said light guide member to said incident surface and a second direction defined between two side surfaces of said light guide member neighboring said incident surface respectively.

8. The light guide member as claimed in claim 7, wherein said at least two different directions include two directions that are perpendicular to each other.

9. A surface light source module, comprising:

a light source, and a light guide member having a light incident surface for entrance of light from said light source and a light emitting surface for emitting said light therefrom, a bottom surface interferingly located in a path of said light from said light incident surface and said light emitting surface in said light guide member, said light incident surface being between said bottom surface and said light emitting surface, said bottom surface having at least two sets of diffusing elements extending along at least two different directions respectively to uniformly diffuse said light before said light reaches said light emitting surface, each set of diffusing elements forming a continuous region at said bottom surface, said at least two sets of diffusing elements together totally covering said bottom surface, said at least two sets of diffusing elements comprising V-shaped grooves, said V-shaped grooves of said at least two sets of diffusing elements lying in a same horizontal plane, and said regions formed by said at least two sets of diffusing elements being adjacent to each other but not overlapping;

wherein said at least two sets of diffusing elements comprise three sets of adjacent V-shaped grooves, each of which spans across said bottom surface along a selective direction from a first direction defined from said incident surface to an opposite surface of said light guide member to said incident surface, and a second direction defined between two side surfaces of said light guide member neighboring said incident surface respectively.

10. The light guide member as claimed in claim 9, wherein said at least two different directions are orthogonal to each other.

* * * * *